(12) United States Patent
Takayama

(10) Patent No.: US 6,637,826 B2
(45) Date of Patent: Oct. 28, 2003

(54) CAR SEAT HAVING LOOPED ADJUSTABLE SHOULDER HARNESSES

(75) Inventor: Steven R. Takayama, Atherton, CA (US)

(73) Assignee: Evenflo Company, Inc., Vandalia, OH (US)

(*) Notice: Subject to any disclaimer, the term of this patent is extended or adjusted under 35 U.S.C. 154(b) by 0 days.

(21) Appl. No.: 09/975,919

(22) Filed: Oct. 11, 2001

(65) Prior Publication Data

US 2002/0070593 A1 Jun. 13, 2002

Related U.S. Application Data

(60) Provisional application No. 60/239,497, filed on Oct. 11, 2000.

(51) Int. Cl.[7] .................................................. B60N 2/28
(52) U.S. Cl. .................... 297/484; 297/483; 297/485; 297/468
(58) Field of Search ................................. 297/484, 485, 297/483, 486, 468, 474

(56) References Cited

U.S. PATENT DOCUMENTS

| | | | |
|---|---|---|---|
| 3,512,830 A | * 5/1970 | Norman et al. | .......... 297/250.1 |
| 4,400,013 A | 8/1983 | Imai | |
| 4,461,510 A | 7/1984 | Cunningham et al. | |
| 4,685,741 A | 8/1987 | Tsuge et al. | |
| 4,886,315 A | * 12/1989 | Johnson | ....................... 297/250 |
| 5,022,669 A | 6/1991 | Johnson | |
| 5,026,115 A | 6/1991 | Barnes | |
| 5,061,012 A | 10/1991 | Parker et al. | |
| 5,082,325 A | * 1/1992 | Sedlack | ....................... 297/250 |
| 5,098,161 A | 3/1992 | Minami et al. | |
| 5,328,249 A | 7/1994 | Ball | |
| 5,413,377 A | 5/1995 | Kamiyama et al. | |
| 5,503,461 A | 4/1996 | Schreier | |
| 5,580,128 A | 12/1996 | Johnson et al. | |
| 5,730,500 A | 3/1998 | Cardona | |
| 5,839,793 A | * 11/1998 | Merrick et al. | .............. 297/484 |
| 5,899,534 A | * 5/1999 | Gray | ........................... 297/484 |
| 6,030,047 A | * 2/2000 | Kain | ........................... 297/484 |
| 6,305,745 B1 | * 10/2001 | Rijsdijk | .................... 297/250.1 |
| 6,309,024 B1 | * 10/2001 | Busch | ........................ 297/484 |
| 6,378,950 B1 | * 4/2002 | Takamizu et al. | ........... 297/484 |
| 6,457,774 B2 | * 10/2002 | Baloga | ..................... 297/250.1 |
| 6,463,638 B1 | * 10/2002 | Pontaoe | ......................... 24/614 |
| 6,471,298 B2 | * 10/2002 | Carine et al. | ................ 297/483 |

* cited by examiner

Primary Examiner—Peter M. Cuomo
Assistant Examiner—Stephanie Harris
(74) Attorney, Agent, or Firm—Taft, Stettinius & Hollister LLP

(57) ABSTRACT

A car seat for an infant or child including a seat body having a seat back and a seat pan for receiving an occupant thereon and at least one shoulder harness coupled to the seat body and being shaped and located to fit over the occupant and retain the occupant on the seat body. The car seat further includes a bracket coupled to the at least one shoulder harness. The at least one shoulder harness includes a sliding portion extending from a lower portion of the seat body to an upper portion of the seat body and being slidingly received through the bracket, and a bracket portion extending from the upper portion of the seat body to the bracket and being coupled to the bracket.

23 Claims, 5 Drawing Sheets

CAR SEAT HAVING LOOPED ADJUSTABLE SHOULDER HARNESSES

This application claims priority to U.S. App. Ser. No. 60/239,497, filed Oct. 11, 2000, the contents of which are hereby incorporated by reference.

The present invention is directed to a car seat for an infant or child, and more particularly, to a car seat having an adjustable harness.

BACKGROUND OF THE INVENTION

Car seats are designed to be coupled to the seat of an automotive vehicle and are shaped to securely receive a child or infant thereon. A car seat typically includes a seat body having a seat back and a seat pan. A pair of harnesses extend from the seat back, over the shoulders of the occupant, and are releasably coupled to a buckle connected to the seat pan to securely retain the occupant in the car seat.

Each shoulder harness has an effective length which can be defined as the length of the harness extending from the buckle or seat pan to the seat back of the car seat. In many existing car seats, the effective length of the harnesses cannot be easily adjusted, which requires an occupant to squeeze into or out of the harness when entering or exiting the car seat. Alternately, the effective length of conventional shoulder harness systems can be adjusted by releasing the overall tension in the harness system. However, this method for increasing the effective length of the harnesses has several drawbacks. Firstly, the tension release mechanism may be awkward to access and operate. Secondly, once the tension of the harnesses is released, the tension must then be reset or re-established when an occupant is again placed into the car seat, and it can be difficult and time consuming to set the harness to the precise desired tension.

Accordingly, there is a need for a car seat having shoulder harnesses that can be adjusted to allow easy insertion and removal of the occupant without requiring resetting of the tension of the harness.

SUMMARY OF THE INVENTION

The present invention is a car seat having an adjustable harness, wherein the effective size of the harness can be easily adjusted without requiring adjustment of the tension of the harness. In one embodiment, the invention is a car seat for an infant or child including a seat body having a seat back and a seat pan for receiving an occupant thereon and at least one shoulder harness coupled to the seat body and being shaped and located to fit over the occupant and retain the occupant on the seat body. The car seat further includes a bracket coupled to the at least one shoulder harness. The at least one shoulder harness includes a sliding portion extending from a lower portion of the seat body to an upper portion of the seat body and being slidingly received through the bracket, and a bracket portion extending from the upper portion of the seat body to the bracket and being coupled to the bracket.

Other objects and advantages of the present invention will be apparent from the following description and the accompanying drawings.

DETAILED DESCRIPTION

Figure 1:
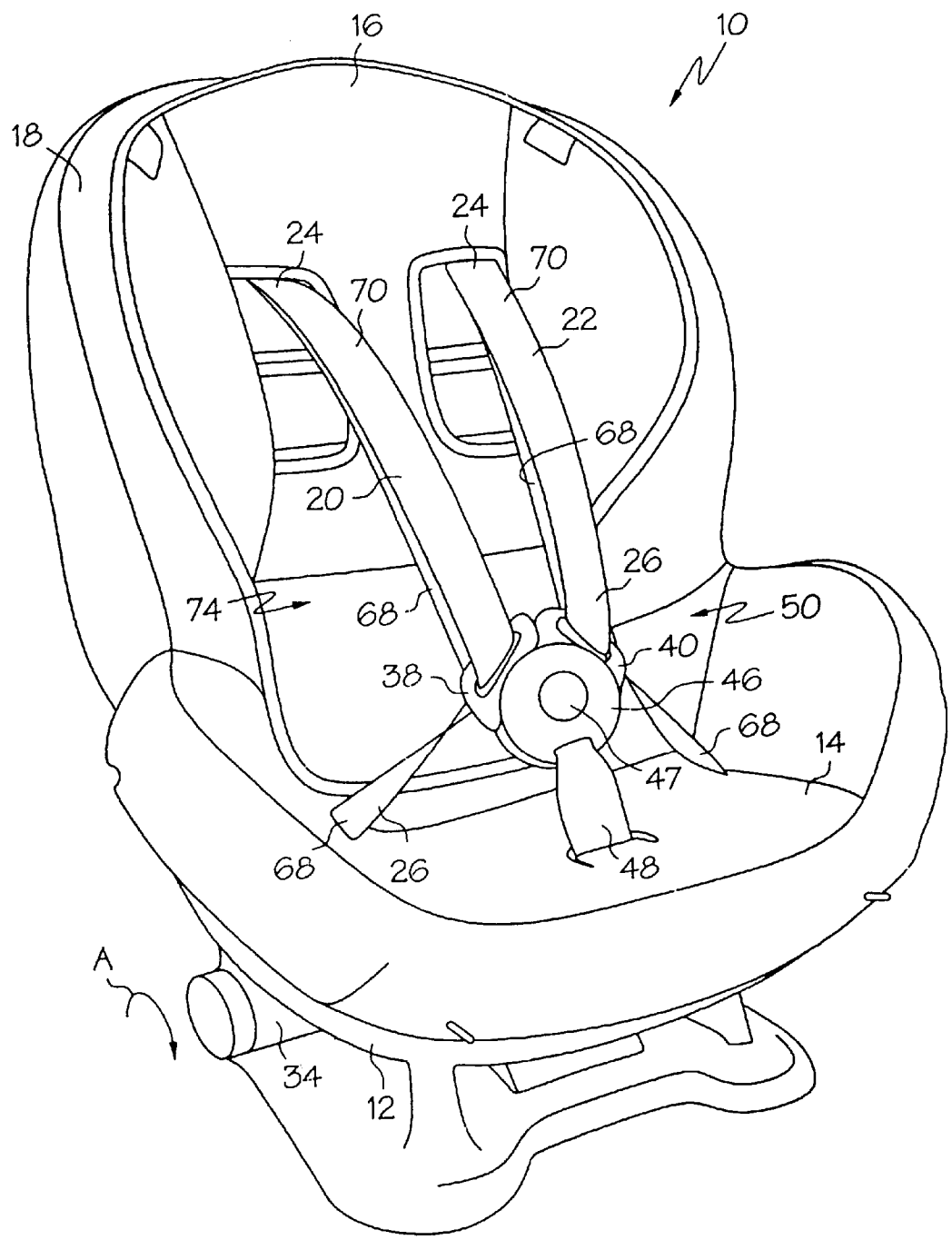
FIG. 1 is a front view of one embodiment of the car seat of the present invention, illustrating a harness of the present invention in its closed position.

As shown in FIGS. 1–6, the present invention is a car seat, generally designated 10, having a relatively rigid shell or seat body 12 having a seat pan 14 and a seat back 16. The car seat 10 may include a layer of cushioned material 18 tightly fit around the shell 12 to provide comfort to the occupant.

The car seat 10 may include a pair of belts or shoulder harnesses 20, 22, each shoulder harness 20, 22 having an upper end 24 and a lower end 26. The lower end 26 of each harness 20, 22 may be passed through one of a pair of openings 30, 32 (see FIG. 2) in the seat pan 14 and wrapped around a rotatable spool 34 located below the seat pan 14. The spool 34 preferably includes a releasable ratchet mechanism such that the spool 34 can be rotated in a direction indicated by the arrow A to tighten the harnesses 20, 22. The spool 34 preferably includes a tension release mechanism (such as a push button, not shown) that can be activated to enable the spool 34 to rotate in a direction to opposite to A loosen the tension in the harnesses 20, 22. However, the spool 34 illustrated herein is only one mechanism for tensioning the harnesses 20, 22, and any of a number of tensioning devices may be used without departing from the scope of the invention. Each harness 20, 22 extends from the spool 34 or other tensioning mechanism, through the openings 30, 32 in the seat pan 14, and is slidably and/or fixedly coupled to a bracket 38, 40.

Each harness 20, 22 is looped about a loop 42 located in or adjacent to the seat back 16 (see FIGS. 3–5 and 7). The loop 42 is coupled to a strap of material 43 which is in turn coupled to an anchor plate 45 located on the back side of the seat back 16. Instead of the loop 42, strap 43 and anchor plate 45, each harness 20, 22 may instead be fixedly coupled to a carriage 49 that is mounted to the seat 10 and vertically slidable to accommodate growth of the occupant in a manner well known in the art. In this case each harness 20, 22 may be looped through an opening of the carriage similar to the illustrated embodiments.

Figure 6:
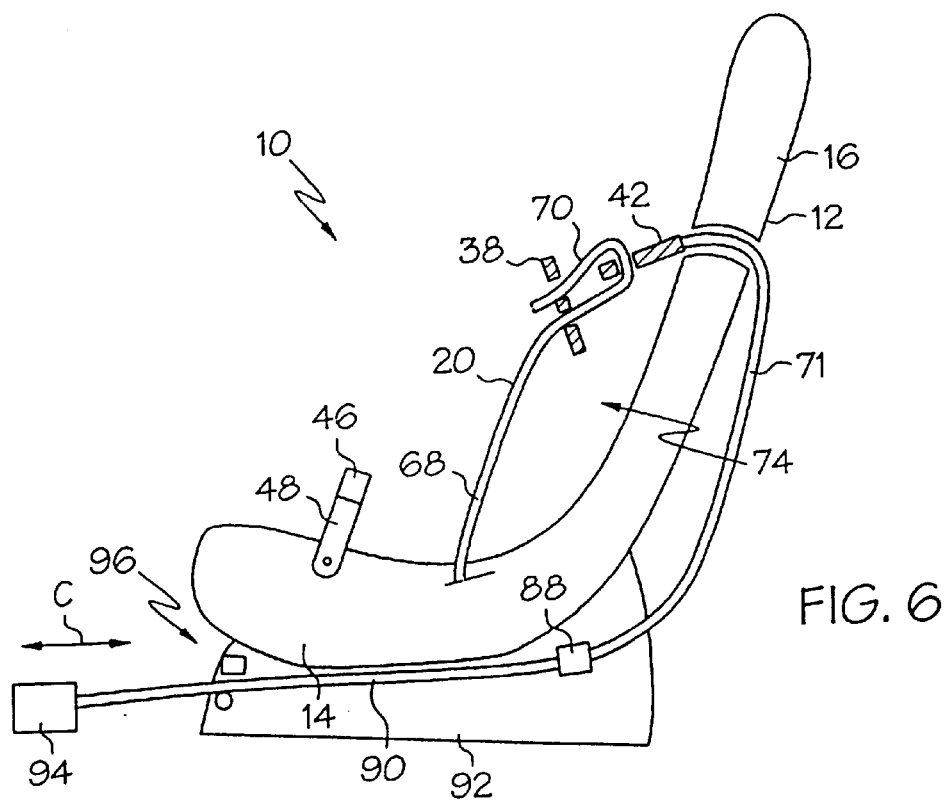
FIG. 6 is a schematic representation of another alternate embodiment of the car seat of the present invention.
Figure 7:
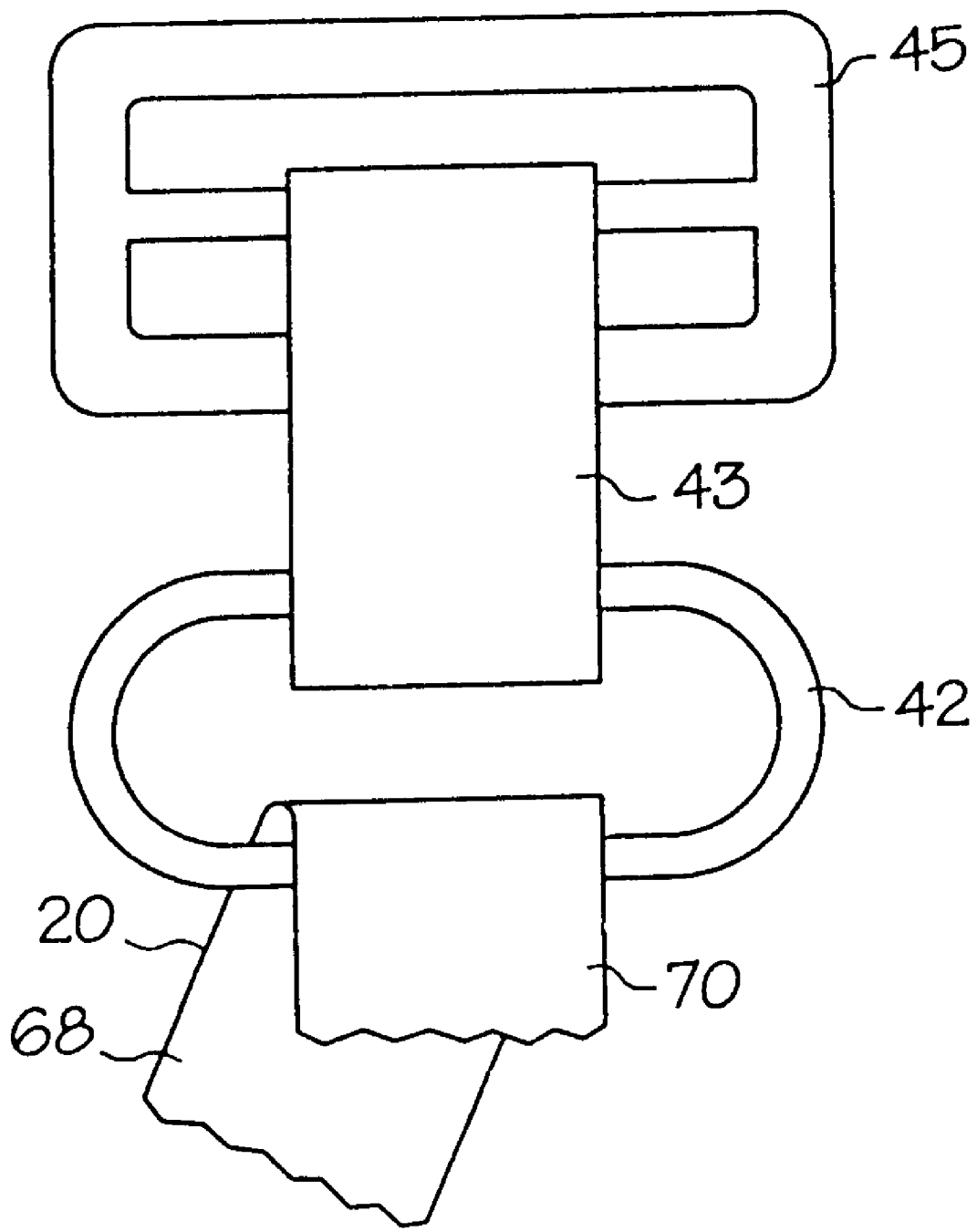
FIG. 7 is a front view of a portion of a belt of the car seat of the present invention.

Furthermore, instead each harness 20, 22 passing through the openings 30, 32 in the seat pan 14, the lower end of each harness 20, 22 may instead be fixedly coupled to the seat pan 14, as shown in FIG. 6. In this case the upper end of each harness 20, 22 may be looped through a loop 42, and each loop 42 may be coupled to a rear belt 71. Each rear belt 71 may extend along the seat back 16 to a splitter plate 88. The splitter plate 88 is coupled to each rear belt 71 and to a lower belt 90. The lower belt 90 extends through an opening in the seat base 92 and includes a handle 94. The seat base 92 includes a A-lock and release mechanism 96 that can be used to releasably grip the lower belt 90. In this manner, the user can adjust the tension in the harnesses 20, 22 by moving the lower belt 90 in the direction of arrow C.

Figure 2:
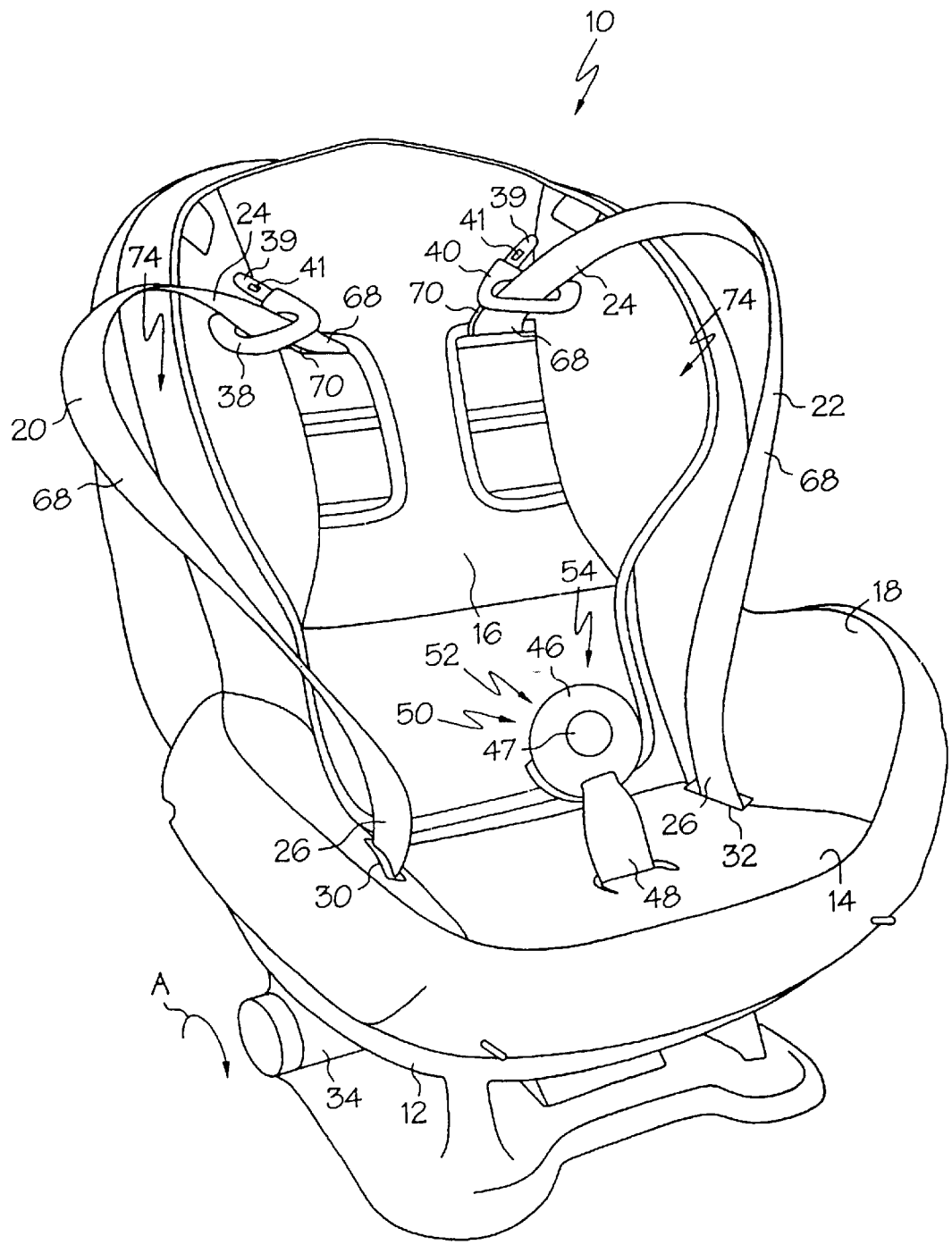
FIG. 2 is a front view of the car seat of FIG. 1, illustrating the harness in its open position.

As shown in FIG. 2, each bracket 38, 40 includes a tongue 39 having an opening 41. The seat 10 includes a buckle 50 which includes a base 46 coupled to the seat pan 14 by a base belt 48. The base 46 has a pair of slots or openings 52, 54 formed therein. Each tongue 39 is shaped to be passed through one of the slots 52, 54 of the base 46 and securely received in the base 46. When each tongue 39 is received in the base 46, the buckle 50 is in its latched condition. The base 46 may include one or more spring biased latches (not shown) and each tongue opening 41 can receive a latch therein when the buckle 50 is in its latched condition to retain the tongues 39 therein. The base 46 may include a button 47 that is actuable to move the spring loaded latch or latches out of engagement with each tongue 39 to enable each bracket 38, 40 to be removed from the base 46, as in a standard buckle for a car seat or seat belt.

Figure 3:
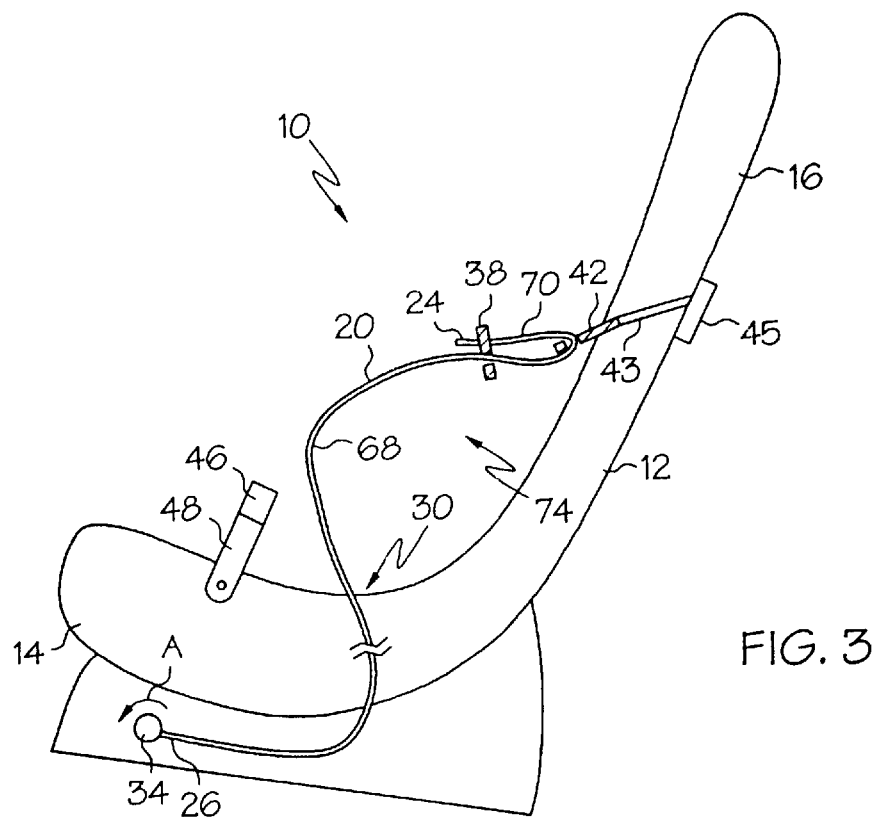
FIG. 3 is a schematic representation of the car seat of the present invention, illustrating the harness in its open position.
Figure 4:
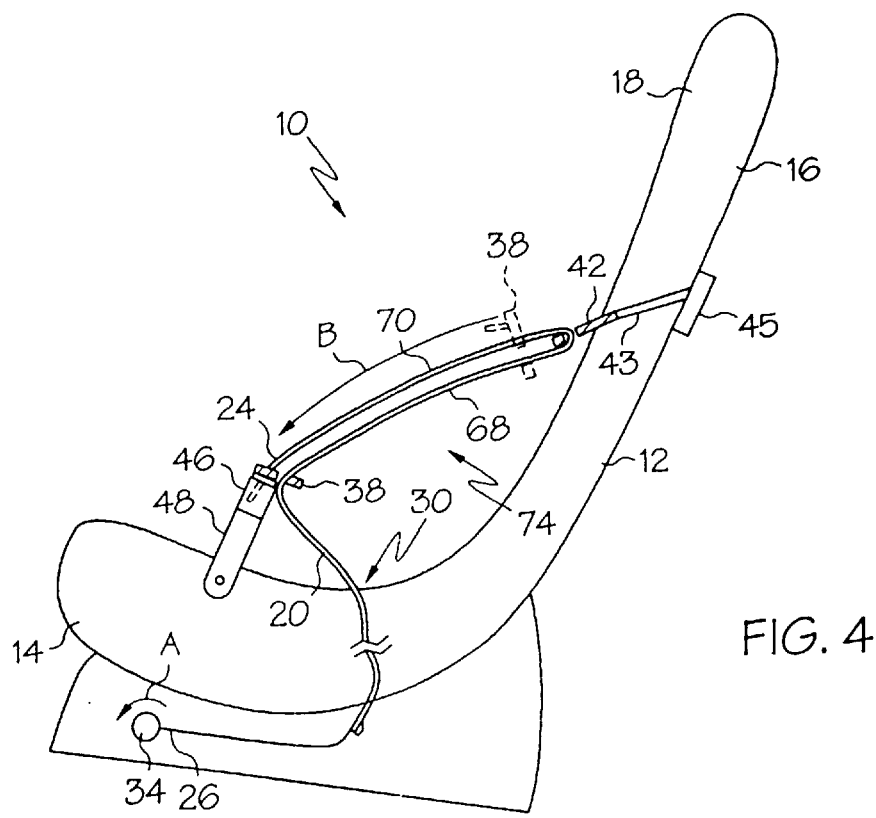
FIG. 4 is a schematic representation of the car seat of FIG. 3, with the harness in its closed position.

As best shown in FIGS. 3 and 4, each shoulder harness 20, 22 includes a rearward portion or sliding portion 68 that extends from a lower portion or seat pan 14 of the seat shell 12 to an upper portion or seat back 16 of the seat shell 12. Each sliding portion 68 is slidingly passed through an associated bracket 38, 40. Each shoulder harness 20, 22 further includes a forward portion or bracket portion 70 that extends from the loop 42 or from an upper portion or seat back 16 of the seat shell 12 to the associated tongue or bracket 38, 40. The lower end of each bracket portion 70 is fixedly secured to the associated bracket 38, 40. In other words, the rearward portion 68 of each harness 20, 22 extends from the seat pan 14 to the loop 42, and the forward portion 70 extends from the loop 42 to a bracket 38, 40. Each shoulder harness 20, 22 is looped about itself such that the forward 70 and rearward 68 portions are generally parallel.

Each harness 20, 22 forms a gap or loop 74 between the harness 20, 22 and the seat back 16. The gap or loop 74 is a gap between the associated harness 20, 22 and the seat back 16, and is the space through which the arm of the occupant can be passed when an occupant is placed in the car seat 10. The effective length of each harness 20, 22 is the length of the rearward portion 68 of each harness. Thus, the larger the effective length of each harness 20, 22, the larger the gap 74 can be made.

The looped nature of the harnesses 20, 22 of the present invention enable a user to vary the size of the gaps 74 of the harnesses 20, 22 (or the effective length of the harnesses) to allow easy insertion and removal of an occupant from the seat 10. For example, as shown in FIGS. 1 and 4, when the bracket 38 is secured in the base 46, the shoulder harness 20 is sized and positioned to be located closely about the shoulders of the occupant (not shown). When it is desired to remove the occupant from the car seat 10, the buckle 50 is released and the bracket 38 removed from the base 46. Next, the bracket 38 is slid towards the upper portion of the seat back 16 by sliding the bracket 38 along the sliding portion 68 of the shoulder harness 20.

This motion of the bracket 38 enables an additional length of the harness 20 to be slid through the carriage or loop 42, thereby increasing the size sliding portion 68, the size of the gap 74, and the effective length of the harness 20 as shown in FIGS. 2, 3 and 6. The increased size of the sliding portion 68 and the gap 74 enables the arms and shoulders of an occupant to be easily placed and removed from under the shoulder harness 20. The same procedure can be carried out with the bracket 40 and shoulder harness 22 to increase the effective size of the shoulder harness 22.

In order to secure an occupant in the car seat 10, the occupant is located onto the seat pan 14, and his or her arms are passed through the gaps 74 of each shoulder harness 20, 22 when the car seat is in its condition as shown in FIGS. 2 and 3. The shoulder harnesses 20, 22 are then "tightened down" by moving the brackets 38, 40 toward the base 46 shown by the arrow B of FIG. 4. As the rearward portion 68 of the harnesses 20, 22 slides through the brackets 38, 40 the size of the rearward portion 68, gaps 74 and the effective length of the harnesses 20, 22 are reduced. Furthermore, once the brackets 38, 40 are latched in the base 46, the gaps 74 are automatically sized to the desired size (i.e., the size of the harnesses of 20, 22 before the effective size of the harnesses 20, 22 was adjusted) and the shoulder harnesses 20, 22 are automatically tightened down to the desired tension. Next, if necessary, the spool 34 or other tension adjust mechanism (i.e. lock and release mechanism 96) may be rotated to tighten the harnesses 20, 22 to their desired position and tension over the occupant.

Figure 5:
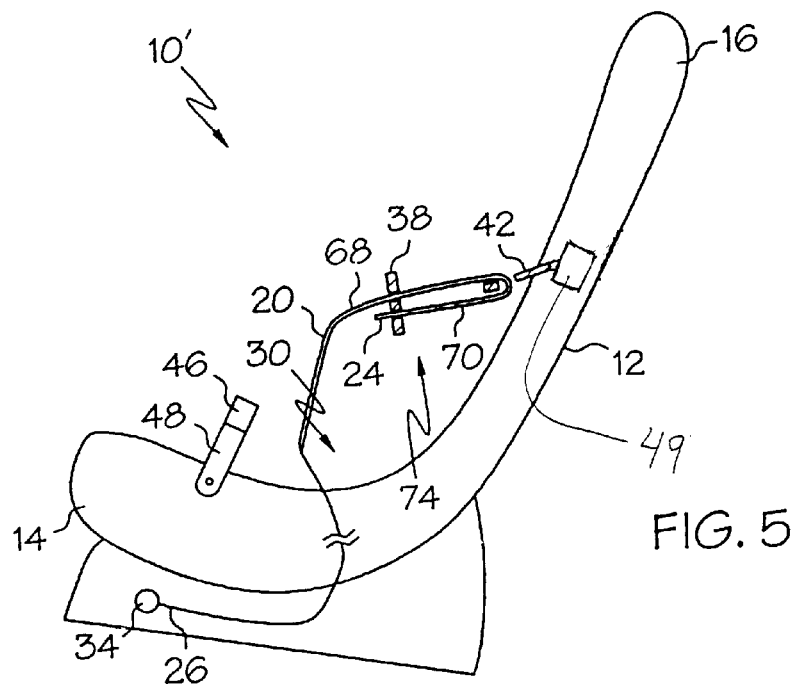
FIG. 5 is a schematic representation of an alternate embodiment of the car seat of the present invention.

FIG. 5 illustrates an alternate embodiment 10' of the car seat of the present invention. In this embodiment the "rearward portion" or sliding portion 68 is located above the "forward portion" or bracket portion 70 of the harness 20. The remaining features of the car seat 10' are the same as that described above; that is, the sliding portion 68 is slidingly received through the bracket 38 and the lower end of the bracket portion 70 is secured to the bracket 38. The size of the gap 74 can be adjusted by sliding the bracket 38 along the sliding portion 68.

This looped nature of the shoulder harnesses 20, 22 enables the size of the gaps 74 and effective length of each shoulder harness 20, 22 to be increased or decreased by sliding the brackets 38, 40 along the length of the shoulder harnesses. This feature provides a significant advantage over conventional shoulder harness systems. In a conventional shoulder harness system, the size of the gaps and effective length of the shoulder harnesses are typically not adjustable when removing an occupant from the seat. This requires an occupant to "squeeze" into or out of the harness. In contrast, looped nature of the shoulder harnesses 20, 22 of the present invention enables the size of the gaps 74 and effective lengths to be significantly increased or decreased, which provides much greater space for an occupant to fit under the harnesses.

Alternately, when using a conventional car seat, the size of the gaps and effective length of the shoulder harnesses can be adjusted by releasing the overall tension in the harness system (i.e., in the illustrated embodiment, by unspooling the harnesses 20, 22 off of the spool 34). However, this method for increasing the size of the gaps has several drawbacks. Firstly, the tension release mechanism (i.e., the spool) may be located at an inconvenient location. Furthermore, if the tension of the harnesses is released to remove an occupant from the car seat, the tension must then be reset or re-established when an occupant is again placed into the car seat. It can be difficult and time consuming to adjust the harness to the precise, desired tension. Accordingly, the present invention enables the gaps of the harnesses to be adjusted to allow easy insertion and removal of the occupant, but does not require resetting of the tension of the harness. In this manner, the tension of the harnesses of the car seat of the present invention can remain at a desired set value, and needs to be adjusted only infrequently (i.e. upon sufficient growth of the occupant, use of bulky clothing by the occupant, use with a differently sized occupant, etc.).

Having described the invention in detail and by reference to the preferred embodiments, it will be apparent that modifications and variations thereof are possible without departing from the scope of the invention.

What is claimed is:

1. A car seat for an infant or child comprising:

a seat body having a seat back and a seat pan for receiving an occupant thereon;

at least one shoulder harness coupled to said seat body and being shaped and located to fit over said occupant and retain said occupant on said seat body; and a bracket coupled to said at least one shoulder harness, said at least one shoulder harness including a sliding portion extending from a lower portion of said seat body to an upper portion of said seat body and being slidingly received through said bracket and a bracket portion extending from said upper portion of said seat body to said bracket and being coupled to said bracket such that when said bracket is gripped and moved said sliding portion is slidably passed through said bracket and said bracket portion generally is not slidably passed through said bracket, said shoulder harness being looped about itself such that said sliding portion and said bracket portion are generally parallel.

2. The car seat of claim 1 wherein said at least one shoulder harness is looped about said upper portion of said seat body.

3. The car seat of claim 1 further comprising a carriage coupled to said upper portion of said seat body, said at least one harness being passed though an opening of said carriage to slidingly couple said at least one shoulder harness to said carriage.

4. The car seat of claim 3 wherein said carriage is movable relative to said seat pan to adjust the height of said at least one shoulder harness.

5. The car seat of claim 1 wherein said bracket is shaped to be coupled to said seat pan of said seat body.

6. The car seat of claim 1 further comprising a base coupled to said seat pan, and wherein said bracket includes a tongue that can be releasably received in said base.

7. The car seat of claim 1 wherein said at least one shoulder harness includes an upper end, and wherein said bracket is coupled to said at least one shoulder harness adjacent to said upper end.

8. The car seat of claim 1 wherein said at least one shoulder harness includes a lower end that extends through said seat pan.

9. The car seat of claim 8 wherein said lower end is coupled to a rotatable spool such that said lower end can be wound about said rotatable spool to adjust the tension of said at least one shoulder harness.

10. The car seat of claim 1 further comprising an auxiliary shoulder harnesses coupled to said seat body and being shaped and located to fit over said occupant and retain said occupant on said seat body, and an auxiliary bracket, wherein said auxiliary shoulder harness includes a sliding portion extending from a lower portion of said seat body to an upper portion of said seat body and being slidingly received through said auxiliary bracket and a bracket portion extending from said upper portion of said seat body to said auxiliary bracket and being coupled to said auxiliary bracket.

11. A car seat for an infant or child comprising:

a seat body having a seat back and a seat pan for receiving an occupant thereon;

a pair of shoulder harnesses coupled to said seat body and being shaped and located to fit over said occupant and retain said occupant on said seat body;

a carriage coupled to movable along said seat back, each shoulder harness being looped about said carriage; and a pair of brackets, each bracket being directly or indirectly attachable to said seat pan and being coupled to one of said shoulder harnesses, each shoulder harness including a sliding portion extending from a lower portion of said seat body to an upper portion of said seat body and being slidingly received through the associated bracket and a bracket portion extending from said upper portion of said seat body to the associated bracket and being coupled to the associated bracket.

12. A car seat for an infant or child comprising:

a seat body having a seat back and a seat pan for receiving an occupant thereon;

a first and a second shoulder harness, each shoulder harness being coupled to said seat body and being shaped and located to fit over said occupant and retain said occupant on said seat body; and a first and a second bracket, said first bracket being fixedly coupled to said first shoulder harness and slidingly receiving said first shoulder harness therethrough, said second bracket being fixedly coupled to said second shoulder harness and slidingly receiving said second shoulder harness therethrough, each bracket having a tongue that is shaped to be releasably coupled to said seat pan wherein each shoulder harness is looped about a component that is generally fixedly coupled to said seat back such that one loop of each looped shoulder harness is said bracket portion and the other loop of each looped shoulder harness is said sliding portion.

13. A car seat for an infant or child comprising:

a seat body having a seat back and a seat pan for receiving an occupant thereon;

a pair of brackets shaped to be directly or indirectly releasably coupled to said seat pan; and a pair of shoulder harnesses coupled to said seat body and being shaped and located to fit over said occupant and retain said occupant on said seat body, each shoulder harness having an effective length portion extending from said seat pan to said seat back, each shoulder harness being slidably coupled to one of said brackets such that the effective length portion of each shoulder harness can be adjusted by sliding the associated bracket along the associated shoulder harness.

14. A method for adjusting a shoulder harness of a car seat for an infant or child comprising the steps of:

providing a car seat including a seat body having a seat back and a seat pan for receiving an occupant thereon, a shoulder harness coupled to said seat body and being shaped and located to fit over said occupant and retain said occupant on said seat body, and a bracket coupled to said shoulder harness, said shoulder harness including a sliding portion extending from a lower portion of said seat body to an upper portion of said seat body and being slidingly received through said bracket and a bracket portion extending from said upper portion of said seat body to said bracket; and sliding said bracket along said shoulder harness such that said sliding portion is slidably passed through said bracket and said bracket portion generally is not slidably passed through said bracket to adjust the effective length of said shoulder harness.

15. The car seat of claim 1 wherein said bracket portion is fixedly coupled to said bracket.

16. The car seat of claim 1 wherein said shoulder harness is looped about a component that is generally fixedly coupled to said seat body such that one loop of said looped shoulder harness is said bracket portion and the other loop of said looped shoulder harness is said sliding portion.

17. The car seat of claim 16 wherein said sliding portion extends from said seat pan to said component and wherein said bracket portion extends from said component to said bracket.

18. The car seat of claim 1 wherein said bracket is located on an intermediate location of said sliding portion.

19. The car seat of claim 11 wherein each shoulder harness extends from an upper portion of said seat body to said bracket.

20. The car seat of claim 11 wherein each shoulder harness is looped about said carriage such that one loop of each looped shoulder harness is said bracket portion and the other loop of each looped shoulder harness is said sliding portion.

21. The car seat of claim 12 wherein each sliding portion extends from said seat pan to said component and wherein each bracket portion extends from said component to said bracket.

22. The car seat of claim 13 wherein each shoulder harness is looped about a component that is generally fixedly coupled to said seat body such that one loop of each looped shoulder harness is said bracket portion and the other loop of each looped shoulder harness is said sliding portion.

23. The car seat of claim 22 wherein each sliding portion extends from said seat pan to said component and wherein each bracket portion extends from said component to said bracket.

* * * * *